United States Patent
Park

(10) Patent No.: US 7,898,757 B2
(45) Date of Patent: Mar. 1, 2011

(54) HARD DISK DRIVE WITH DIVIDED DATA SECTORS AND HARD DISK DRIVE CONTROLLER FOR CONTROLLING THE SAME

(75) Inventor: Jae-Chun Park, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 264 days.

(21) Appl. No.: 12/171,055

(22) Filed: Jul. 10, 2008

(65) Prior Publication Data

US 2009/0021853 A1    Jan. 22, 2009

(30) Foreign Application Priority Data

Jul. 18, 2007   (KR) .................. 10-2007-0071792

(51) Int. Cl.
    *G11B 5/09* (2006.01)
(52) U.S. Cl. .......................................... 360/53; 360/39
(58) Field of Classification Search .................. None
    See application file for complete search history.

(56) References Cited

U.S. PATENT DOCUMENTS

| 7,080,200 B2 * | 7/2006 | Hassner et al. ............. 711/114 |
| 2007/0189137 A1 * | 8/2007 | Saito et al. .............. 369/47.32 |
| 2007/0273995 A1 * | 11/2007 | Unoki et al. ................. 360/39 |

FOREIGN PATENT DOCUMENTS

| JP | 08-235752 | 9/1996 |
| JP | 10-334607 | 12/1998 |
| JP | 2000-200153 | 7/2000 |
| KR | 1020030022392 | 3/2003 |

OTHER PUBLICATIONS

Colegrove, Dan "Large Physical Sector Size" Feb. 12, 2002 e01138r1 "http://www.t13.org/documents/uploadeddocuments/docs2002/e01138r1.pdf".*
English Abstract for Publication No. 08-235752.
English Abstract for Publication No. 10-334607.
English Abstract for Publication No. 2000-200153.
English Abstract for Publication No. 1020030022392.

* cited by examiner

*Primary Examiner*—Jason C Olson
(74) *Attorney, Agent, or Firm*—F. Chau & Associates, LLC

(57) ABSTRACT

A hard disk drive controller includes a buffer block temporarily storing recording data received from a host or reproduced data to be output to the host. A formatter outputs the recording data or the reproduced data and outputs a first control signal and a second control signal based on error information of partial data sectors included in a data sector corresponding to the recording data or the reproduced data. An error correction code block encodes and outputs data corresponding to partial data sectors having no errors in the received recording data based on the first control signal received from the formatter during a write operation and decodes data corresponding to partial data sectors having no errors in the received reproduced data based on the first control signal and outputs the decoded data in response to the second control signal during a read operation.

18 Claims, 6 Drawing Sheets

HARD DISK DRIVE WITH DIVIDED DATA SECTORS AND HARD DISK DRIVE CONTROLLER FOR CONTROLLING THE SAME

CROSS-REFERENCE TO RELATED PATENT APPLICATION

This application claims priority to Korean Patent Application No. 10-2007-0071792, filed on Jul. 18, 2007, in the Korean Intellectual Property Office, the disclosure of which is incorporated herein in its entirety by reference.

BACKGROUND OF THE INVENTION

1. Technical Field

The present invention relates to a hard disk drive and more particularly, to a hard disk drive with divided data sectors and a hard disk drive controller for controlling the same.

2. Discussion of the Related Art

Hard disk drives are data storage devices that read and write information to and from a magnetic disk. Hard disk drives write information to the disk via a write head and read information from the disk via a read head according to a command (e.g., a write command or a read command) received from a host (e.g., a personal computer (PC)). The disk includes a plurality of tracks. Each of the tracks is divided into a plurality of logical units called sectors. Writing/reading is performed in units of sectors. Generally, each sector is 512 bytes in size. With the increase of storage capacity of hard disk drives, the recording density of disks is increased and the number of sectors per track is also increased.

The storage capacity of hard disk drives has been increasing, and as they process more data, a signal-to-noise ratio (SNR) and a bit error ratio (BER) also increase proportionally. When the number of sectors per track increases, the size of an address mark and error correction code (ECC) corresponding to each sector also increases, and therefore, there is a limit to how many sectors may be included in each track. Accordingly, methods of increasing the storage capacity of tracks by increasing the capacity of a sector from 512 bytes to 1 Kbytes or 4 Kbytes have been researched and developed.

However, when an error occurs in a data sector, all data in that sector may be lost. Accordingly, as the size of the sectors increase, the amount of data that is lost to a sector error is also increased.

SUMMARY OF THE INVENTION

Exemplary embodiments of the present invention provide a hard disk drive including a hard disk drive controller for reducing the loss of storage space in a data sector when an error occurs in the data sector by dividing each data sector into a plurality of partial data sectors.

According to some exemplary embodiments of the present invention, there is provided a hard disk drive controller including a buffer block configured to temporarily store recording data received from a host or reproduced data to be output to the host. A formatter is configured to output the recording data or the reproduced data and output a first control signal and a second control signal based on error information of partial data sectors included in a data sector corresponding to the recording data or the reproduced data. An error correction code (ECC) block is configured to encode and output recording data corresponding to partial data sectors having no errors in the received recording data based on the first control signal received from the formatter during a write operation. The ECC is also configured to decode reproduced data corresponding to partial data sectors having no errors in the received reproduced data. Decoding is based on the first control signal. The decoded reproduced data is output in response to the second control signal during a read operation.

The formatter may include an error sector control block configured to calculate and output error information of the data sector; and a format control block configured to output the first control signal for controlling encoding or decoding of recording data or reproduced data, which corresponds to partial data sectors having no errors in the data sector, based on the error information.

The format control block may output the second control signal for outputting reproduced data corresponding to desired partial data sectors in the reproduced data decoded by the ECC block.

The data sector may be 4 Kbytes in size and each of the partial data sectors in the data sector may be 512 bytes in size.

According to exemplary embodiments of the present invention, there is provided a hard disk drive including a disk comprising a plurality of data sectors. A controller is configured to encode and output recording data corresponding to partial data sectors having no errors in a data sector corresponding to recording data received from a host. Reproduced data corresponding to partial data sectors having no errors in a data sector corresponding to reproduced data output from the disk is decoded and output by the controller. A read/write channel circuit is configured to output encoded recording data received from the controller based on a write control signal and to output reproduced data output from the disk to the controller based on a read control signal.

The controller may include a buffer block configured to temporarily store recording data received from the host or reproduced data to be output to the host. A formatter is configured to output the recording data or the reproduced data and output a first control signal and a second control signal based on error information of partial data sectors included in a data sector corresponding to the recording data or the reproduced data. An ECC block is configured to encode and output recording data corresponding to partial data sectors having no errors in the received recording data based on the first control signal received from the formatter during a write operation and is also configured to decode reproduced data corresponding to partial data sectors having no errors in the received reproduced data based on the first control signal and output the decoded reproduced data in response to the second control signal during a read operation.

The formatter may include an error sector control block configured to calculate and output error information of the data sector. The formatter may also include a format control block configured to output the first control signal for controlling encoding or decoding of recording data or reproduced data, which corresponds to partial data sectors having no errors in the data sector, based on the error information.

According to exemplary embodiments of the present invention, a method of controlling partial data sectors in a hard disk drive includes encoding recording data corresponding to partial data sectors having no errors in a data sector corresponding to received recording data based on error information of the data sector and outputting the encoded recording data during a write operation. Reproduced data corresponding to partial data sectors having no errors in a data sector corresponding to received reproduced data is decoded based on error information of the data sector. During a read operation, the decoded reproduced data is outputted or desired reproduced data in the decoded reproduced data is outputted. The encoded recording data is written in response to a write control signal during the write operation. The reproduced data is read in response to a read control signal during the read operation.

BRIEF DESCRIPTION OF THE DRAWINGS

The above and other features and aspects of exemplary embodiments of the present invention will be described in detail below with reference to the attached drawings in which.

DETAILED DESCRIPTION OF THE EXEMPLARY EMBODIMENTS

Figure 1:
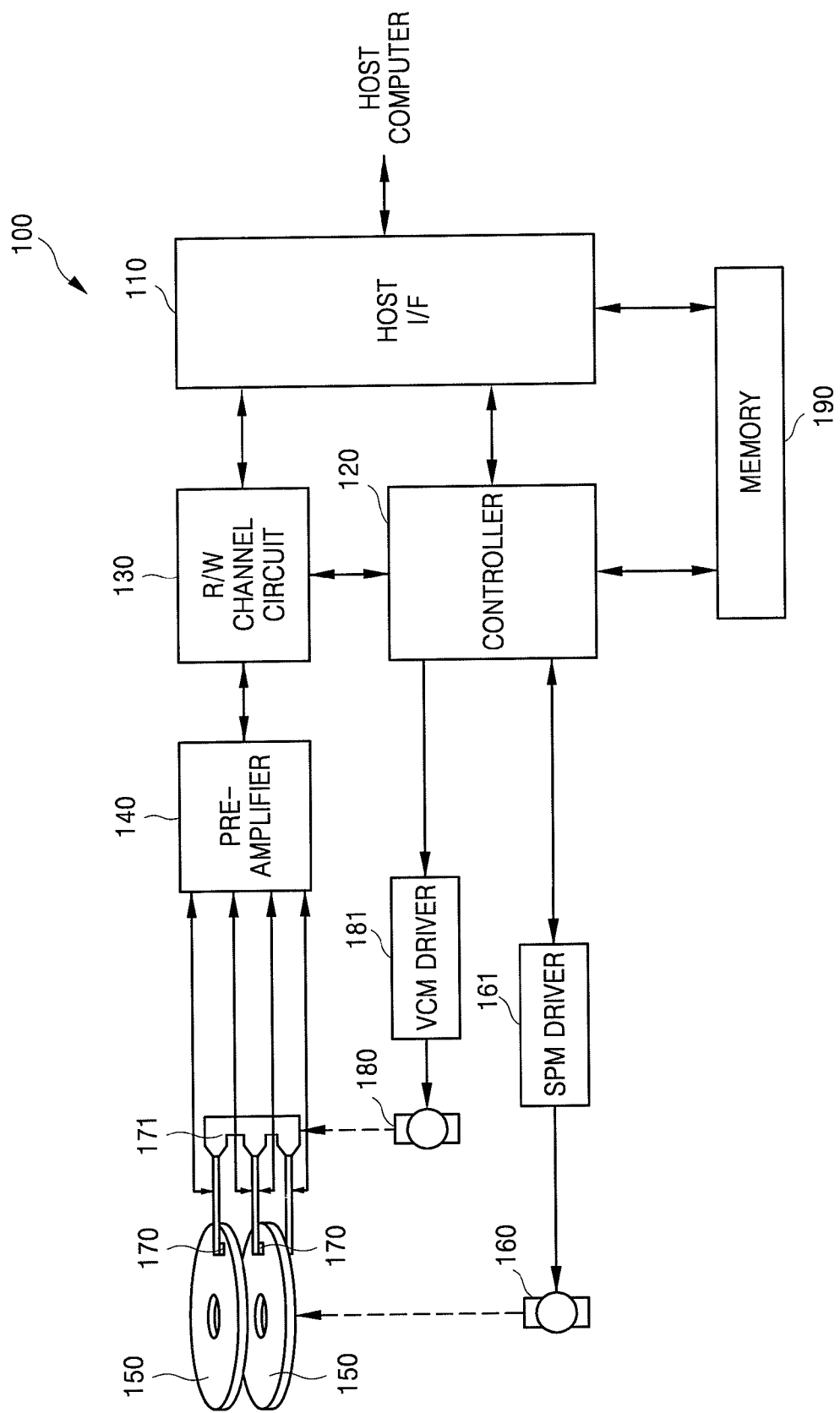
FIG. 1 is a schematic block diagram of a hard disk drive according to exemplary embodiments of the present invention.

Exemplary embodiments of the present invention are described more fully hereinafter with reference to the accompanying drawings. This invention may, however, be embodied in many different forms and should not be construed as limited to the exemplary embodiments set forth herein. In the drawings, the size and relative sizes of layers and regions may be exaggerated for clarity. Like numbers may refer to like elements throughout.

It will be understood that when an element is referred to as being "connected" or "coupled" to another element, it can be directly connected or coupled to the other element or intervening elements may be present.

FIG. 1 is a schematic block diagram of a hard disk drive 100 according to exemplary embodiments of the present invention. The hard disk drive 100 includes a host interface (I/F) 110, a controller 120, a read/write (R/W) channel circuit 130, a pre-amplifier 140, disks 150, a spindle motor (SPM) 160, an SPM driver 161, magnetic heads 170, an actuator arm 171, a voice coil motor (VCM) 180, a VCM driver 181, and a memory 190.

The host I/F 110, the controller 120, and the R/W channel circuit 130 may be implemented on a single chip. The SPM driver 161 and the VCM driver 181 may be implemented on a single chip. The host I/F 110 may include a control circuit (not shown) which controls the hard disk drive 100 to interface with a host, for example, a personal computer (PC). The host I/F 110 may be referred to as a disk data controller (DDC) or a hard disk controller (HDC) by some manufacturers.

The host I/F 110 controls the transfer of recording data and an access command (e.g., a write command or a read command), which are received from the host. The host I/F 110 transmits the recording data to the memory 190 and the access command to the controller 120. In addition, the host I/F 110 transmits reproduced data, which has been read and sent by a read head (not shown), to the host.

The controller 120 controls recording data received from the host and reproduced data of a data sector (e.g., 4 Kbytes) received from the disks 150 in units of partial data sectors (e.g., 512 bytes). For instance, the controller 120 divides recording data, which is received from the host in units of 4-Kbyte data sectors, and reproduced data, which is read from the disks 150 in units of 4-Kbyte data sectors, into a plurality of partial data sectors (for example, there may be 8 partial data sectors in each data sector) to control the data. In some exemplary embodiments, the data sectors are 4 Kbytes in size and are divided into 8 512-byte partial data sectors, but the present invention is not restricted to these embodiments.

Figure 2:
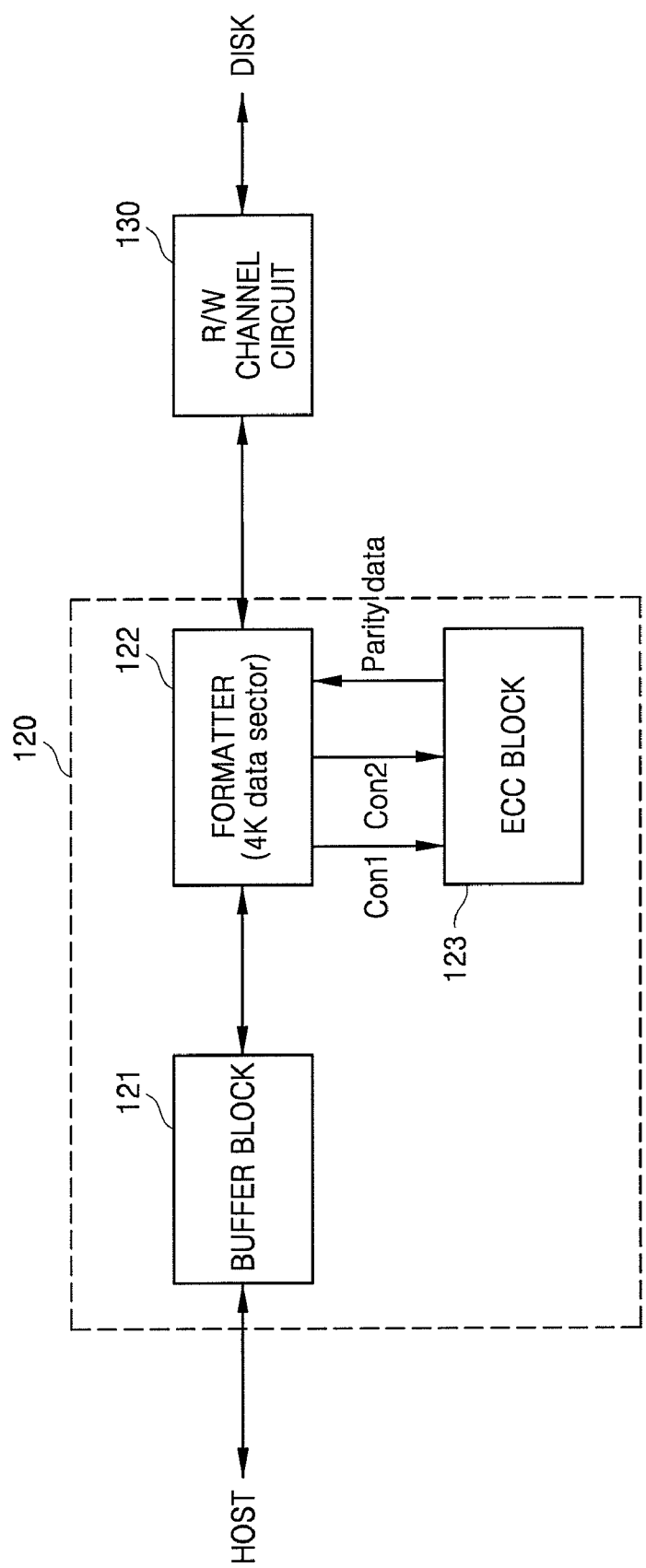
FIG. 2 is a schematic block diagram of a controller illustrated in FIG. 1.

FIG. 2 is a schematic block diagram of a hard disk drive controller, for example, the controller 120 illustrated in FIG. 1. Referring to FIGS. 1 and 2, the controller 120 includes a buffer block 121, a formatter 122, and error correction code (ECC) block 123.

The buffer block 121 temporarily stores recording data, which has been received from the host and stored in the memory 190, before outputting it to the formatter 122. The buffer block 121 temporarily stores reproduced data received from the formatter 122 before outputting it to the memory 190. The formatter 122 outputs a first control signal Con1 to the ECC block 123 based on error information of partial data sectors corresponding to recording data, which is generated based on a result of monitoring a data sector. In addition, the formatter 122 receives reproduced data from the R/W channel circuit 130 and outputs the first control signal Con1 to the ECC block 123 based on error information of partial data sectors corresponding to the reproduced data, which is generated based on a result of monitoring a data sector.

Figure 3:
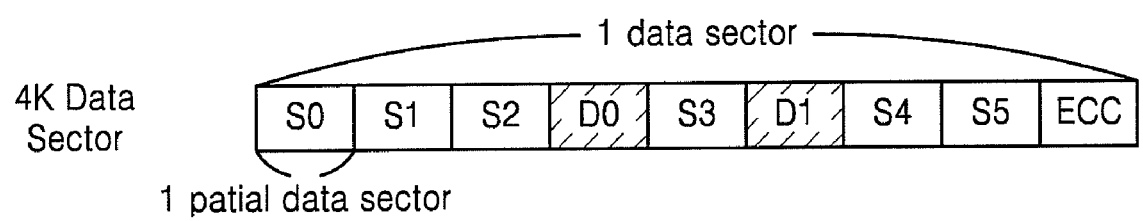
FIG. 3 is a diagram for explaining the operation of the controller illustrated in FIG. 2.

FIG. 3 is a diagram for explaining the operation of the controller 120 illustrated in FIG. 2. Referring to FIG. 3, a single data sector is divided into 8 partial data sectors S0, S1, S2, S3, S4, S5, D0, and D1. Referring to FIGS. 2 and 3, when errors occur in the fourth and sixth partial data sectors D0 and D1, the formatter 122 outputs the first control signal Con1 to the ECC block 123 based on error information of the data sector. For example, the formatter 122 outputs the first control signal Con1 at a first level (e.g., "0") with respect to the partial data sectors S0 through S5 having no errors and outputs the first control signal Con1 at a second level (e.g., "1") with respect to the partial data sectors D0 and D1 having errors. The ECC block 123 detects the partial data sectors D0 and D1 having errors based on the second level ("1") of the first control signal Con1 and encodes or decodes the partial data sectors S0 through S5 that have no errors based on the first level ("0") of the first control signal Con1.

In addition, the formatter 122 may output a second control signal Con2 based on the error information in order to output data of the partial data sectors S0 through S5 having no errors to the buffer block 121 without the partial data sectors D0 and D1 having errors. For example, the formatter 122 outputs the second control signal Con2 at a second level (e.g., "1") for the partial data sectors S0 through S5 having no errors and outputs the second control signal Con2 at a first level (e.g., "0") for the partial data sectors D0 and D1 having errors. The ECC block 123 outputs the data of the partial data sectors S0 through S5 having no errors to the buffer block 121 based on the second level ("1") of the second control signal Con2.

According to exemplary embodiments of the present invention, the formatter 122 may output the second control signal Con2 in order to selectively output data of partial data sectors that are desired to be output to the buffer block 121 among the partial data sectors S0 through S5 having no errors. For example, the formatter 122 outputs the second control signal Con2 at the second level ("1") for the partial data sectors desired to be output to the buffer block 121 and outputs the second control signal Con2 at the first level ("0") for the rest of the partial data sectors. For example, to selectively output only data of the fifth and seventh partial data sectors S3 and S4, the formatter 122 outputs the second control signal Con2 at the second level ("1") for the partial data sectors S3 and S4. The ECC block 123 outputs to the buffer block 121 the partial data sectors (e.g., S3 and S4) desired to be output to the buffer block 121 based on the second level ("1") of the second control signal Con2.

Figure 4:
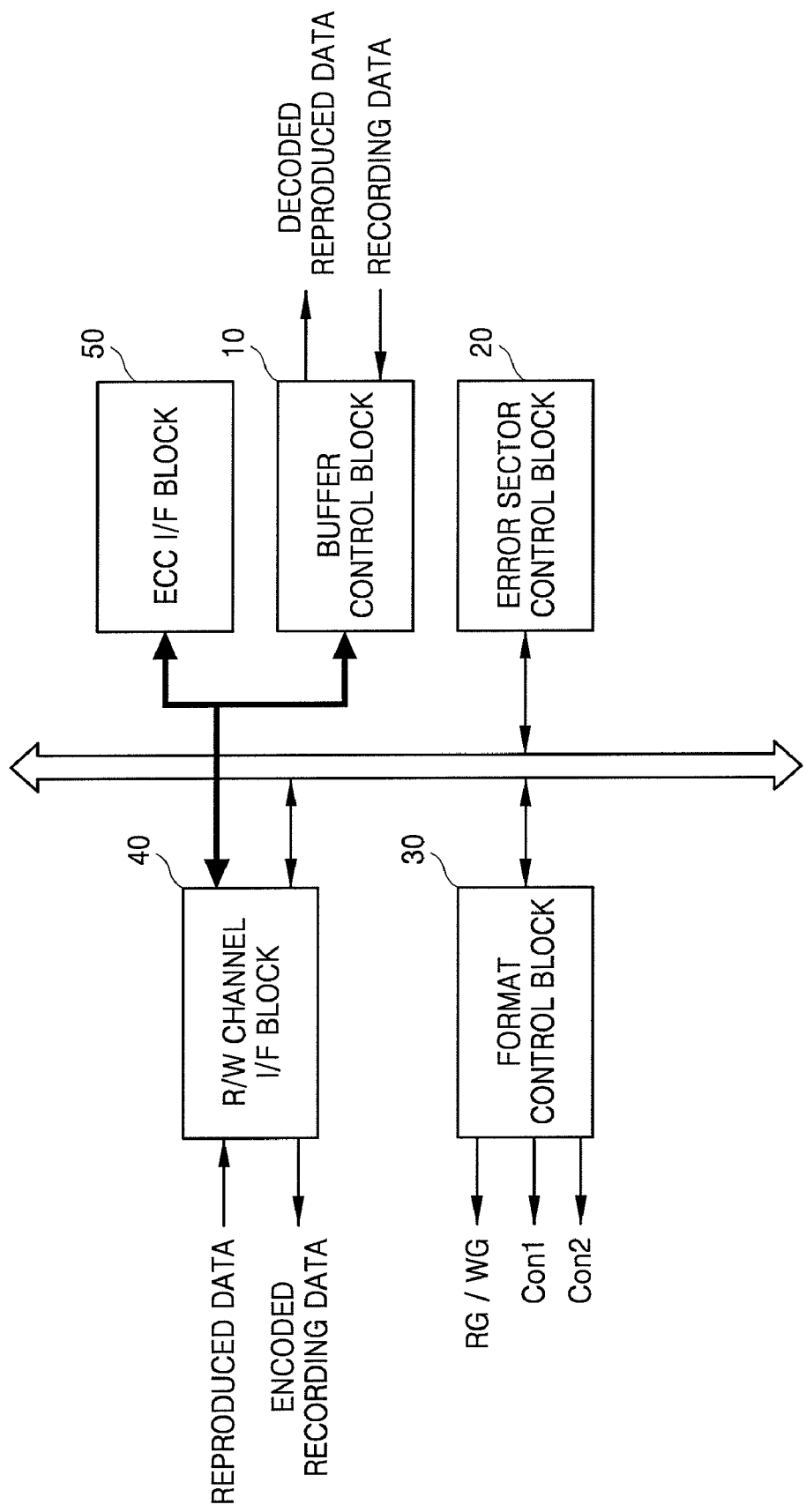
FIG. 4 is a schematic block diagram of a formatter illustrated in FIG. 2.

FIG. 4 is a schematic block diagram of the formatter 122 illustrated in FIG. 2. Referring to FIGS. 2 through 4, the formatter 122 includes a buffer control block 10, an error sector control block 20, a format control block 30, a R/W channel I/F block 40, and an ECC I/F block 50.

In the write operation of the hard disk drive 100, the buffer control block 10 outputs recording data received from the buffer block 121 to the ECC block 123 via the ECC I/F block 50. In the read operation of the hard disk drive 100, the buffer control block 10 receives reproduced data, which has been decoded by and output from the ECC block 123, and outputs the reproduced data to the buffer block 121.

The error sector control block 20 monitors data sectors of the disks 150 and outputs a result of the monitoring to the format control block 30 during the operation of the hard disk drive 100. For example, the error sector control block 20 outputs error information of partial data sectors of each data sector to the format control block 30.

The format control block 30 generates a write control signal WG and a read control signal RG and outputs them to the R/W channel circuit 130 via the R/W channel I/F block 40. In addition, the format control block 30 receives the error information of the partial data sectors of each data sector from the error sector control block 20 and outputs the first control signal Con1 to the ECC block 123 based on the error information. The format control block 30 may output the second control signal Con2 based on the error information in order to output only data of the partial data sectors S0 through S5 having no errors to the buffer block 121 without the partial data sectors D0 and D1 having errors. In some exemplary embodiments of the present invention, the format control block 30 may output the second control signal Con2 in order to selectively output data of partial data sectors that are desired to be output to the buffer block 121 among the partial data sectors S0 through S5 having no errors.

The R/W channel I/F block 40 transmits data to and receives data from the R/W channel circuit 130. The ECC I/F block 50 transmits data to and receives data from the ECC block 123.

In the write operation, the ECC block 123 receives data of the 8 partial data sectors S0 through S5, D0, and D1 from the formatter 122, generates parity data of the normal partial data sectors S0 through S5 except for the partial data sectors D0 and D1 having errors based on the first control signal Con1, and outputs encoded recording data to the R/W channel circuit 130 via the formatter 122.

In the read operation, the ECC block 123 receives reproduced data of the 8 partial data sectors S0 through S5, D0, and D1 from the R/W channel circuit 130 and decodes the reproduced data of the 8 partial data sectors S0 through S5, D0, and D1 based on the first control signal Con1 received from the formatter 122. In addition, the ECC block 123 outputs the decoded reproduced data of the partial data sectors S0 through S5 having no errors to the buffer block 121 or outputs the decoded reproduced data of desired partial data sectors among the partial data sectors S0 through S5 having no errors to the buffer block 121, based on the second control signal Con2 received from the formatter 122.

Figure 5:
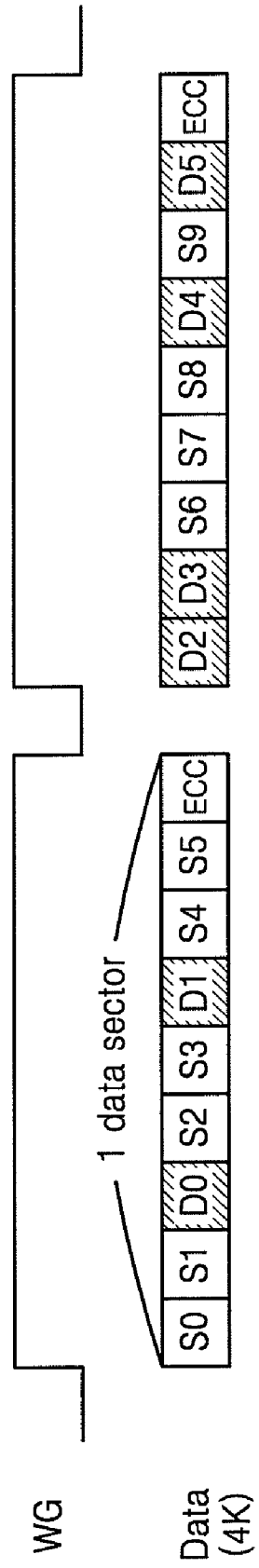
FIG. 5 is a diagram for explaining a write operation according to exemplary embodiments of the present invention.

FIG. 5 is a diagram for explaining a write operation according to exemplary embodiments of the present invention. Referring to FIGS. 2 and 5, in the write operation of the hard disk drive 100, the ECC block 123 generates parity data for data of the partial data sectors S0 through S5 having no errors in recording data based on the first control signal Con1 received from the formatter 122 and outputs encoded recording data to the R/W channel circuit 130 via the formatter 122. The R/W channel circuit 130 outputs the encoded recording data in response to the write control signal WG received from the formatter 122.

Figure 6:
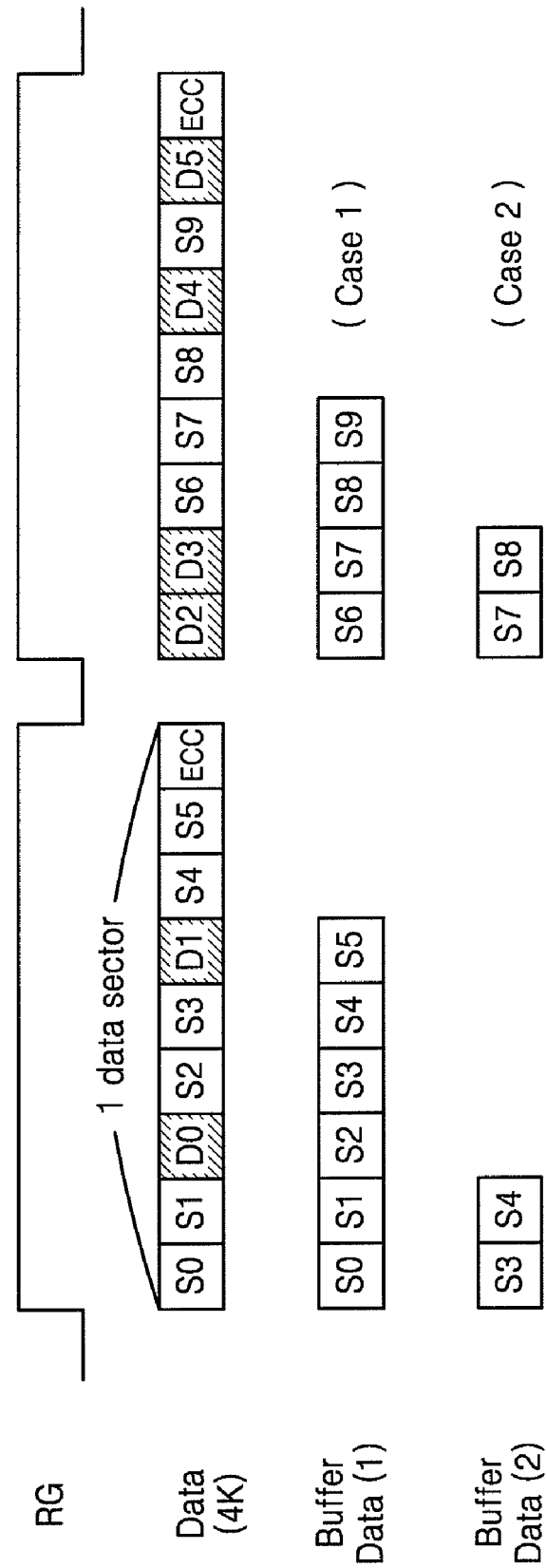
FIG. 6 is a diagram for explaining a read operation according to exemplary embodiments of the present invention.

FIG. 6 is a diagram for explaining a read operation according to exemplary embodiments of the present invention. Referring to FIGS. 2 and 6, in the read operation, of the hard disk drive 100, the R/W channel circuit 130 receives reproduced data of a data sector from the disks 150 and outputs the reproduced data to the formatter 122 based on the read control signal RG received from the formatter 122. At this time, the reproduced data includes data of the partial data sectors D0 and D1 having errors and data of the partial data sectors S0 through S5 having no errors.

The formatter 122 outputs the reproduced data to the ECC block 123 and generates and outputs the first control signal Con1 and the second control signal Con2 to the ECC block 123 based on error information of the data sector.

The ECC block 123 decodes the reproduced data of the 8 partial data sectors S0 through S5, D0, and D1 and outputs decoded reproduced data of the partial data sectors S0 through S5 having no errors in the decoded reproduced data of the data sector based on the first control signal Con1. In addition, the ECC block 123 may output decoded reproduced data of desired partial data sectors S3 and S4 in the decoded reproduced data to the buffer block 121 based on the second control signal Con2.

As in the write operation, the hard disk drive 100 can also use data of the rest of partial data sectors and refrain from using data of partial data sectors having errors in a data sector in the read operation, thereby reducing the loss of storage capacity.

Referring back to FIG. 1, the controller 120 may be implemented by a digital signal processor (DSP), a microprocessor, or a micro controller and controls the write and read operations of the hard disk drive 100. The controller 120 controls the operation of the SPM driver 161 which controls the driving of the SPM 160 or the operation of the VCM driver 181 which controls the driving of the VCM 180 according to a write or read command received from the host. To write data to or read data from the disks 150, the controller 120 determines a target track based on address information included in the write or read command received via the host I/F 110 and performs a seek control or a following control to move a corresponding one of the magnetic heads 170 to the target track.

The R/W channel circuit 130 outputs recording data received from the host to the disks 150 via the pre-amplifier 140 based on the write control signal WG received from the controller 120. In addition, the R/W channel circuit 130 receives reproduced data from a read head (not shown) and transmits the reproduced data to the controller 120 based on the read control signal RG received from the controller 120.

The pre-amplifier 140 is connected between the read head and the R/W channel circuit 130. The pre-amplifier 140 amplifies a signal reproduced through the read head and transmits the reproduced signal to the R/W channel circuit 130. In addition, the pre-amplifier 140 converts a signal received from the R/W channel circuit 130 into a write current and outputs the write current to a write head (not shown).

The disks 150 includes a plurality of concentric tracks (or cylinders) and record data received from the host. Each of the tracks includes a plurality of data sectors. Each of the data sectors includes a plurality of partial data sectors. For instance, when the data sector is 4 Kbytes in size, it can be divided into 8 512-byte partial data sectors. A servo pattern indicating position information of the tracks or cylinders is written to the disks 150 during the manufacturing of the hard disk drive 100.

The SPM 160 rotates the disks 150 in response to a control signal received from the SPM driver 161. The SPM driver 161 drives the SPM 160 in compliance with the controller 120 and controls the velocity of the SPM 160 to be suitable for reading data from or writing data to the disks 150.

The magnetic heads 170 include a read head and a write head and write data to or read data from the disks 150 in response to a signal received via the pre-amplifier 140. The actuator arm 171 moves the magnetic heads 170 to a target track. The VCM 180 moves the actuator arm 171 in response to a control signal output from the VCM driver 181 driven by the controller 120 so that magnetic heads 170 are positioned at the target track.

The memory 190 temporarily stores data transferred among the host, the controller 120, and the R/W channel circuit 130 and stores execution programs and various setting values for the controller 120.

As described above, according to exemplary embodiments of the present invention, a hard disk drive controller divides a data sector into a plurality of partial data sectors during a read operation and a write operation, so that the rest of the data sector except for partial data sectors having errors can be used. As a result, the loss of storage capacity can be reduced.

While exemplary embodiments of the present invention have been particularly shown and described with reference to the drawings, it will be understood by those of ordinary skill in the art that various changes in form and details may be made therein without departing from the spirit and scope of the present invention.

What is claimed is:

1. A hard disk drive controller comprising:
a formatter controlling encoding of recording data or decoding of reproduced data, which is stored to a hard disk drive in a plurality of data sectors, each of which is divided into a plurality of partial data sectors;
an error correction code (ECC) block encoding and outputting data stored in the partial data sectors having no errors or decoding data stored in partial data sectors having no errors; and
a buffer block temporarily storing the recording data received from a host or the reproduced data output to the host; and wherein
the formatter outputs the recording data or the reproduced data and outputs a first control signal and a second control signal based on error information of partial data sectors included in a data sector corresponding to the recording data or the reproduced data; and
the error correction code (ECC) block encodes and outputs data corresponding to partial data sectors having no errors in the received data based on the first control signal received from the formatter during a write operation; or decodes data corresponding to partial data sectors having no errors in the received reproduced data based on the first control signal and outputting the decoded data in response to the second control signal during a read operation.

2. The hard disk drive controller of claim 1, wherein the formatter comprises:
an error sector control block calculating and outputting error information of the data sector; and
a format control block outputting the first control signal for controlling encoding or decoding of recording data or reproduced data, which corresponds to partial data sectors having no errors in the data sector, based on the error information.

3. The hard disk drive controller of claim 2, wherein the format control block outputs the second control signal for outputting reproduced data corresponding to desired partial data sectors in the reproduced data decoded by the ECC block.

4. The hard disk drive controller of claim 1, wherein each of the data sectors is 4 Kbytes in size and each of the partial data sectors is 512 bytes in size.

5. The hard disk controller of claim 1, wherein each of the data sectors is 1 Kbytes in size and each of the partial data sectors is 512 bytes in size.

6. The hard disk controller of claim 1, wherein the controller is implemented on a single chip along with a read/write channel circuit and a host interface.

7. A hard disk drive comprising:
a disk comprising a plurality of data sectors;
a controller encoding and outputting recording data corresponding to partial data sectors having no errors in a data sector corresponding to recording data received from a host and decoding and outputting reproduced data corresponding to partial data sectors having no errors in a data sector corresponding to reproduced data output from the disk; and
a read/write channel circuit outputting encoded recording data received from the controller based on a write control signal and outputting reproduced data output from the disk to the controller based on a read control signal,
wherein the controller comprises:
a buffer block temporarily storing recording data received from the host or reproduced data output to the host;
a formatter outputting the recording data or the reproduced data and outputting a first control signal and a second control signal based on error information of partial data sectors included in a data sector corresponding to the recording data or the reproduced data; and
an error correction code (ECC) block encoding and outputting data corresponding to partial data sectors having no errors in the received data based on the first control signal received from the formatter during a write operation; or decoding data corresponding to partial data sectors having no errors in the received reproduced data based on the first control signal and outputting the decoded data in response to the second control signal during a read operation.

8. The hard disk drive of claim 7, wherein the formatter comprises:
an error sector control block calculating and outputting error information of the data sector; and
a format control block outputting the first control signal for controlling encoding or decoding of recording data or reproduced data, which corresponds to partial data sectors having no errors in the data sector, based on the error information.

9. The hard disk drive of claim 8, wherein the format control block outputs the second control signal for outputting reproduced data corresponding to desired partial data sectors in the reproduced data decoded by the ECC block.

10. The hard disk drive of claim 9, wherein the data sector is 4 Kbytes in size and each of the partial data sectors in the data sector is 512 bytes in size.

11. The hard disk drive of claim 9, wherein the data sector is 1 Kbytes in size and each of the partial data sectors in the data sector is 512 bytes in size.

12. The hard disk drive of claim 7, wherein the controller is implemented on a single chip along with the read/write channel circuit and a host interface.

13. The hard disk drive of claim 7, wherein the formatter includes an R/W channel interface block, a format control block, an ECC interface block, a buffer control block, and an error selector control block.

14. A method of controlling partial data sectors in a hard disk drive, the method comprising:
- encoding recording data corresponding to partial data sectors having no errors in a data sector corresponding to the received recording data based on error information of the data sector and outputting the encoded recording data during a write operation;
- decoding reproduced data corresponding to partial data sectors having no errors in a data sector corresponding to received reproduced data based on error information of the data sector and outputting the decoded reproduced data or outputting only desired reproduced data in the decoded reproduced data during a read operation;
- writing the encoded recording data in response to a write control signal during the write operation;
- reading the reproduced data in response to a read control signal during the read operation; and
- temporarily storing the encoded recording data prior to writing or temporarily storing the reproduced data output to the host prior to reading, wherein:
  - the encoded recording data or the reproduced data and a first control signal and a second control signal is output based on error information of partial data sectors included in a data sector corresponding to the encoded recording data or the reproduced data; and
  - data corresponding to partial data sectors having no errors in the received data is encoded and output based on the first control signal received during a write operation; or data corresponding to partial data sectors having no errors in the received reproduced data is decoded based on the first control signal and the decoded data is outputted in response to the second control signal received during a read operation.

15. The method of claim 14, wherein the data sector is 4 Kbytes in size and each of the partial data sectors in the data sector is 512 bytes in size.

16. The method of claim 14, wherein the data sector is 1 Kbytes in size and each of the partial data sectors in the data sector is 512 bytes in size.

17. The method of claim 14, wherein the encoding, decoding, writing and reading is performed by a hard disk drive controller.

18. The method of claim 14, wherein the encoding, decoding, writing and reading is performed for data stored on a hard disk drive.

* * * * *